United States Patent [19]

Schwarz et al.

[11] 4,186,975
[45] Feb. 5, 1980

[54] BEARING SEAL AND LUBRICATING DEVICE

[75] Inventors: Alois Schwarz, Putzbrunn; Karlheinz Mautz, Ottobrunn; Hubert Frommlet, Munich, all of Fed. Rep. of Germany

[73] Assignee: Messerschmitt-Boelkow-Blohm GmbH, Munich, Fed. Rep. of Germany

[21] Appl. No.: 861,560

[22] Filed: Dec. 16, 1977

[30] Foreign Application Priority Data

Dec. 23, 1976 [DE] Fed. Rep. of Germany ....... 2658409

[51] Int. Cl.² .......................................... F16C 33/76
[52] U.S. Cl. .............................. 308/187; 308/187.1; 308/207 R; 416/134 A; 416/174
[58] Field of Search ............ 416/134 A, 138 A, 174; 308/187, 187.1, 187.2, 36.1–36.5, 78, 107, 121–122, DIG. 12, DIG. 15, 76–77, 207 R, 118, 119, 169

[56] References Cited

U.S. PATENT DOCUMENTS

| 2,675,280 | 4/1954 | Meadows | 308/169 |
|---|---|---|---|
| 3,325,088 | 6/1967 | Keen et al. | 308/187 X |
| 3,610,774 | 10/1971 | Mouille | 416/174 X |

Primary Examiner—Douglas C. Butler
Attorney, Agent, or Firm—W. G. Fasse; D. F. Gould

[57] ABSTRACT

A bearing seal for the outer and inner blade angle bearings of a rotor hub of a rotary wing aircraft comprises a lubricating oil chamber interconnecting the inner and outer bearings and extending coaxially therebetween. The bearings are provided with sealing rings at their faces opposite the lubricating oil chamber. A shielding member is positioned in front of the face of the outer blade angle bearing facing the lubricating oil chamber. A receptacle is arranged as part of the chamber and positioned in operative relationship with the deflector member for entrapping particles contained in the lubricating oil and separated therefrom by the effect of centrifugal forces as the oil migrates from the inner blade angle bearing toward the outer bearing.

10 Claims, 3 Drawing Figures

BEARING SEAL AND LUBRICATING DEVICE

BACKGROUND OF THE INVENTION

The invention is directed to a bearing seal for the outer and inner blade angle bearings of the rotor hub of a rotary wing aircraft, comprising a lubricating oil chamber interconnecting the two bearings and connected to a device for replenishing lubricating oil, and a sealing ring arranged on that side of each of the bearings facing away from the lubricating oil chamber.

Known sealing arrangements for lubricants for the blade angle bearings of helicopter rotors utilize either a grease or an oil lubrication.

Grease lubrication has the disadvantage that the lubricating grease under the effect of the centrifugal force of the rotating rotor hub is separated into its components of different specific gravity and thus quickly loses its ability to lubricate, so that lubricating has to be repeated often in order to press the exhausted grease from the bearing chambers to the exterior and to replace it by a new grease filling.

These difficulties do not present themselves in known bearing seals of the kind mentioned at the beginning which utilize oil lubrication, since lubricating oils are not separated under the centrifugal force effect of the rotor, only the unavoidable relatively minor losses due to leakage at the sealing rings having to be replaced from the lubricating oil chamber extending between the two bearing chambers, or from a replenishing device. Here, however, heavy dirt particles, in particular, metallic shavings, present in the lubricating oil are centrifugally separated from the inner blade angle bearing and the lubricating oil chamber into the outer bearing causing heavy soiling and premature wear of the bearing races and of the sealing ring sealing the bearing chamber of the outer roller or sliding bearing to the exterior.

OBJECTS OF THE INVENTION

By contrast, a bearing seal of the claimed type is to be provided in accordance with the invention which prevents dirt particles from penetrating under the effect of the centrifugal forces from the lubricating oil chamber into the outer blade angle bearing, thus insuring functioning of the bearings with little wear and maintenance.

SUMMARY OF THE INVENTION

In accordance with the invention, this task is solved by a bearing seal of the claimed type which is characterized by the fact that on the bearing side of the outer blade angle bearing facing the lubricating oil chamber there is arranged a rejector member covering the bearing, that the lubricating oil chamber is provided with a receptacle for the dirt particles separated under the effect of centrifugal force, the receptacle being positioned adjacent the rejector member and being open in the direction of the inner blade angle bearing, and that the bearing chamber located between the rejector member and the sealing ring of the outer blade angle bearing is connected to the lubricating oil chamber by way of a lubricating oil conduit avoiding or bypassing the receptacle.

In the bearing seal in accordance with the invention, dirt particles migrating outwardly in the direction of the axis of the blade angle bearing are intercepted by the rejector member covering the outer blade angle bearing and precipitate in the adjoining receptacle without being able to penetrate into the lubricating oil conduit leading to the bearing chamber of the outer blade angle bearing. The bearing seal in accordance with the invention is not only effectively protects the outer bearing from dirt particles but it also has the special effect of self-cleansing, since the dirt particles are separated from the lubricating oil under the effect of the centrifugal force and collect as sediment in the receptacle without requiring special oil filter or the like. Aside from being useful as a seal for the bearing of blade angle bearings of a rotor hub, the invention is exceedingly useful in applications where oil lubrication of sliding or roller bearings is subject to centrifugal forces acting in the direction of the bearing axis, as for instance, for sealing the bearings of an adjustable blade arrangement in turbines or compressors.

In accordance with a further advantageous embodiment of the invention, the rejector member is inclined in the direction of the adjoining receptacle so that dirt particles colliding with the rejector member migrate unobstructedly into the receptacle under the effect of the centrifugal force.

An improved protection of the bearing chamber of the outer blade angle bearing from penetration of dirt particles is efficaciously obtained in that the rejector member comprises a sealing ring sealing the lubricating oil chamber from the bearing chamber of the outer blade angle bearing, and in that the lubricating oil conduit in the direction of the inner blade angle bearing opens into the lubricating oil chamber ahead of the receptacle.

For replenishing losses from leakage and for the continuous renewal of the lubricating oil, the lubricating oil chamber is preferably incorporated in a lubricating oil circuit, the filterless self-cleansing effect of the bearing seal in accordance with the invention proving particularly advantageous if shavings or other dirt particles from preceding bearing portions are contained in the supplied lubricating oil. For this reason, the lubricating oil circuit is, for practical purposes, (part of) the lubricating circuit of the transmission of the rotor. In that case, the intake of the oil circuit is preferably located in the area of the inner blade angle bearing with the outlet of the circuit located at the end of the lubricating oil chamber defined by the rejector member, resulting in a good (oil) circulation through the inner bearing and, on the long path between intake and outlet of the oil circuit, in a good cooling effect; and it is ensured that but few dead spaces are present where oil not subjected to the oil circuit can collect. Advantageously, the receptacle is positioned radially displaced between the rejector member and the outlet of the oil circuit. Hence, it forms a final barrier by which passes the entire flow of oil drawn from the outlet of the oil circuit and where dirt particles which may still be contained in the oil flow are entrapped immediately prior to reaching the outlet of the oil circuit.

With a view to a simple, constructive arrangement and for improving the cooling effect, the lubricating oil chamber is preferably formed as an annular chamber extending substantially coaxially with the axis of the blade angle bearing; and the receptacle is preferably an annular groove formed at the end of the chamber and circumscribing the bearing space of the outer blade angle bearing so that all dirt particles present in the lubricating oil chamber precipitate unobstructedly in the receptacle on account of its location at the outer end of the chamber, and that the receptacle is easily accessible for removal of the dirt deposits during routine maintenance of the rotor.

The invention will now be explained by way of example, with reference to the drawings.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
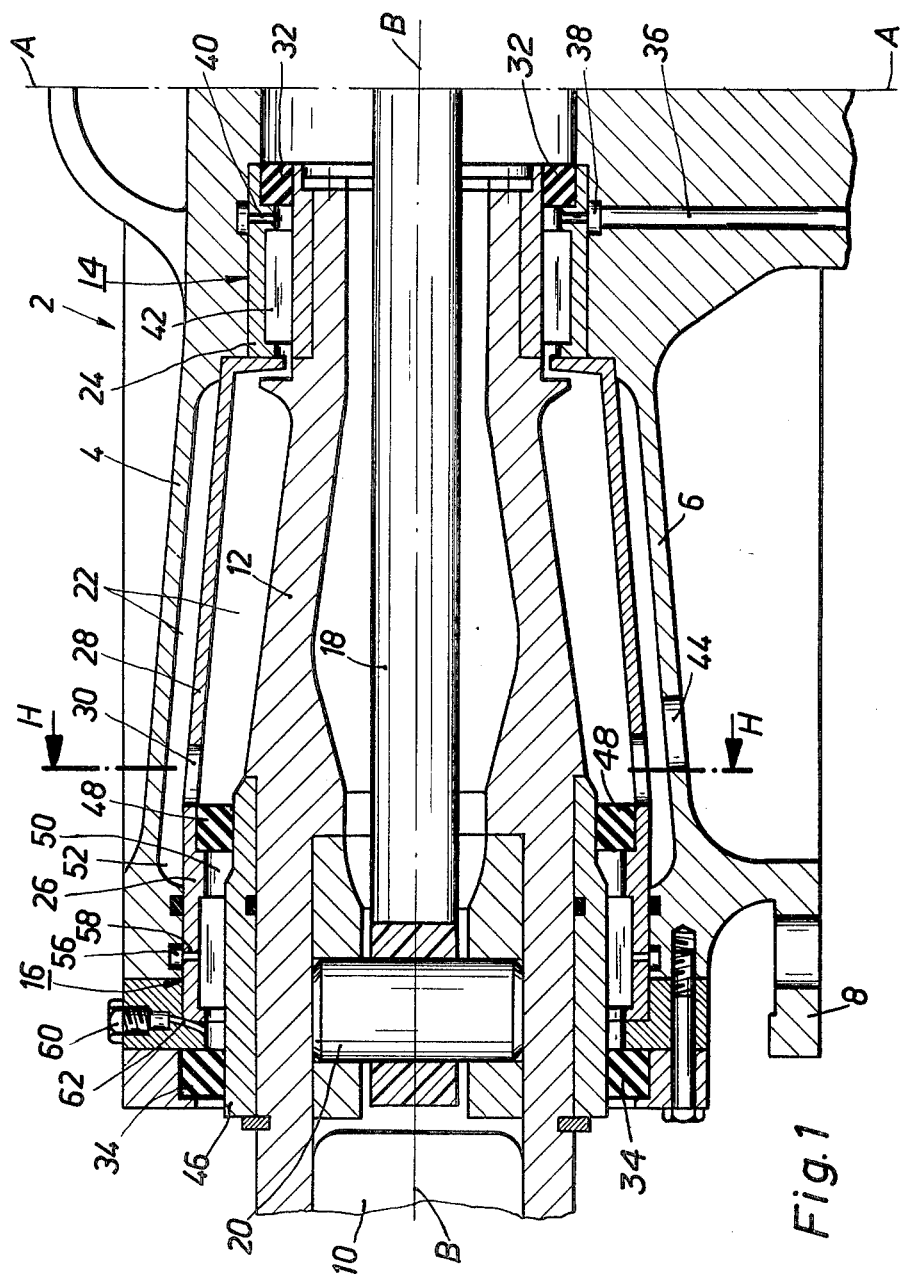
FIG. 1 shows a partial section of the rotor hub along the axis of the blade angle bearing, including a bearing seal in accordance with the invention.

FIG. 1 depicts a rotary wing aircraft or helicopter rotor hub 2 comprising an upper plate 4 and a lower plate 6 forming rotor housing means. The hub 2 is mounted through a flange 8 integral with the lower plate 6 for rotation, about the rotor axis A—A, to the housing of the helicopter transmission (not shown) but located immediately below the lower plate 6. Between the upper and lower plates 4, 6 of the rotor housing there is rotatably supported by radially inner and radially outer blade angle bearings 14, 16 a blade root sleeve 12 fixedly connected to the blade root 10 of one of the rotor blades. The term "radially" in this context has reference to said rotor axis A—A. Thus, the bearing 16 is further away from the rotor axis A—A and hence it is the radially outer blade angle bearing. The bearing 14 is closer to the axis A—A and hence it is the radially inner blade angle bearing. The blade angle bearings 14, 16 comprise roller bearings axially spaced apart along the axis B—B of the blade angle bearings, the roller bearings permitting an angular adjustment in the position of the blades about the axis B—B. For balancing the centrifugal forces effective on the rotor blades, the blade root sleeves 12 of diametrically opposite rotor blades are interconnected by tensile bars 18 fastened to pin 20 inserted in each of the blade root sleeves 12. The bars 18 are torsion-elastic in the range of angular blade movement.

A lubricating oil chamber 22 angularly enclosing the blade root sleeve 12 is positioned between the blade angle bearings 14, 16 and extends substantially coaxially with the blade angle bearing axis B—B. The chamber 22 is divided by a spacer sleeve 28 extending in the longitudinal direction of the chamber and securing the outer rings 24, 26 of the blade angle bearings 14 and 16 against axial displacement, the spacer sleeve 28 being perforated at its end adjacent the outer ring 26 by a plurality of axial slots 30. The blade angle bearings have first sides facing away from the lubricating oil chamber 22. These first sides of the blade angle bearings 14, 16 are each sealed from the exterior and relative to said housing by conventional sealing rings 32 and 34. The second sides of the blade angle bearings 14, 16 face toward the lubricating oil chamber 22.

The lubricating oil chamber 22 is incorporated in the transmission oil flow circuit and is connected to the sump of the transmission by way of an inlet conduit 36 for supplying oil from the sump. The inlet conduit 36 leads to an annular groove 38 surrounding the outer ring 24 of the inner blade angle bearing 14. Several radial bores 40 extending through the ring 24 and positioned between the sealing ring 32 and the roller members 42 open into the bearing space of the inner blade angle bearing 14. From there the lubricating oil, due to the self-pumping effect of the centrifugal forces generated by the rotation of the rotor hub 2, flows across the roller members 42 into the lubricating oil chamber 22 and escapes through the axial slots 30 and the oil outlet opening 44 formed in the lower plate 6 from where the lubricating oil is sprayed on the transmission gears positioned immediately therebelow and then returns to the sump. A closed ring of oil is thus formed between the outer blade angle bearing 16 and the outlet opening 44. The level H of the oil ring in the chamber 22 depends upon the position of the outlet opening 44. In order to protect the outer blade angle bearing 16 from the heavier shavings and other dirt particles contained in the lubricating oil and separated under the centrifugal force effect, there is provided between the outer and inner rings 24, 46 of the outer blade angle bearing 16 a shielding member 48 in the form of a further sealing ring which itself is of conventional construction and blocks the lubricating oil chamber 22 toward the bearing chamber 50 of the blade angle bearing 16. The dirt particles centrifugally removed from the oil ring collect in a receptacle 52 adjoining the radially outer end of the chamber and positioned radially displaced between the sealing ring 48 and the outlet opening 44. The receptacle 52 is open in the direction toward the inner blade angle bearing 14 and, shaped like an annular groove, extends over the bearing chamber 50 of the outer blade angle bearing 16 which chamber 50 is closed by the sealing ring 48 of conventional construction.

Figure 2:
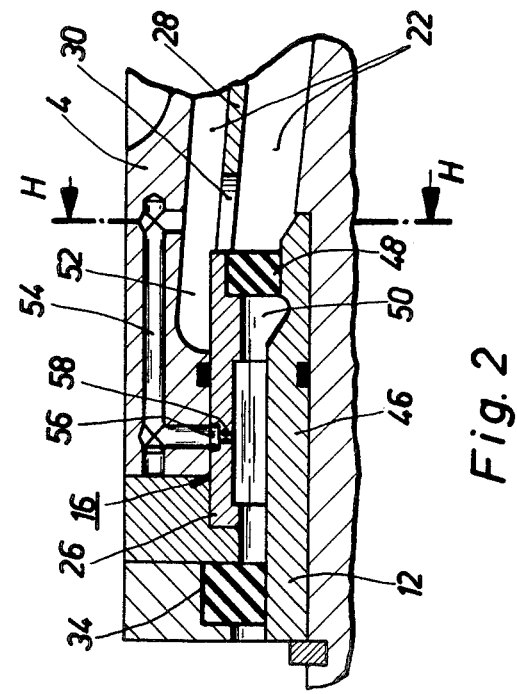
FIG. 2 shows a sectional view of the rotor hub depicted in FIG. 1, in a sectional plane rotated relative to FIG. 1, for illustrating the lubricating oil conduit.

FIG. 2 shows, on a somewhat enlarged scale, the upper left corner of FIG. 1, whereby the section extends in a plane rotated relative to the sectional plane of FIG. 1 about the axis B—B. Therefore, in FIG. 2 the same reference numbers are used as in FIG. 1.

A lubricating oil conduit 54 serves to supply lubricating oil to the bearing chamber 50, the conduit extending substantially in parallel to the axis B—B of the blade angle bearing and opening radially into the lubricating oil chamber 22 between the receptacle 52 and the outlet opening 44. The conduit 54 is connected to the bearing chamber 50 by way of an annular groove 56 surrounding the outer race 26 of the blade angle bearing 16 and by a plurality of radial bores 58 extending through the outer race 26, so that clean oil free of dirt particles is continually supplied to the bearing chamber 50 from the ring of oil in the lubricating oil chamber 22.

The dirt sediments precipitating in the receptacle 52 by centrifugal action are from time to time removed when the bearings 16, 14 are disassembled for maintenance. Prior to operating the rotor, the bearing chamber 50 is filled with lubricating oil by way of a filling conduit 62 sealable by a filling screw 60, and vented by way of the lubricating oil conduit 54.

Figure 3:
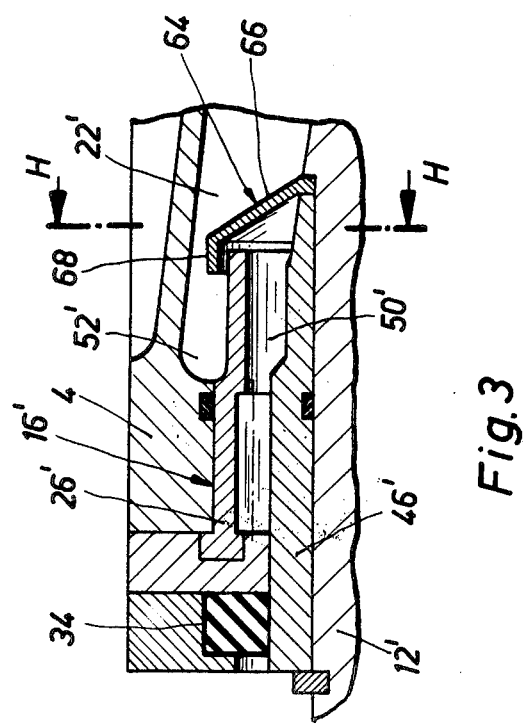
FIG. 3 is a representation corresponding to FIG. 2 showing a further embodiment of the invention.

In the embodiment shown in FIG. 3, structural parts corresponding to similar parts in FIGS. 1 and 2 are identified by the same reference characters the same reference characters, except that for differentiation, a prime (') sign is used in FIG. 3. A sheet metal ring 64, instead of sheet metal ring 64, instead of the sealing ring 48 and the lubricating oil conduit 54, is inserted between the blade root sleeve 12' and the inner race 46' of the outer blade angle bearing 16'. The sheet metal ring 64 is obliquely inclined toward the receptacle 52' and is partially submerged in the ring of oil delimited by level H in the lubricating oil chamber 22'. Dirt particles colliding with the sheet metal ring 64 under the centrifugal force effect migrate along the inclined surface 66 of the sheet metal ring 64 radially outwardly and are centrifugally removed into the outer end of the receptacle 52', whereas oil free of dirt particles can flow into the bearing chamber 50' through an annular gap 68 provided between the outer race 26' of the blade angle bearing 16' and the sheet metal ring 64. As in the embodiment of FIGS. 1 and 2 here, too, an effective protection of the outer bearing 16' against penetration of dirt particles and a self-cleansing effect of the bearing seal are again ensured. As shown in FIGS. 1, 2, and 3 the receptacles 52, 52' form dead end sinks which are open only in the direction toward the inner blade angle bearing 14 and against the centrifugal force direction.

What is claimed is:

1. A bearing seal and lubricating device for the bearings of a rotor, comprising rotor housing means, radially outer bearing means located in said housing means and radially inner bearing means also located in said housing means, lubricating oil chamber means in said housing means operatively interconnecting said radially outer bearing means and said radially inner bearing means, each bearing means having a first side facing away from said lubricating oil chamber means and a second side facing said lubricating oil chamber means, sealing means sealing said inner and outer bearing means at said first side thereof, shielding means operatively arranged to shield said second side of said radially outer bearing means relative to said lubricating oil chamber means, receptacle means in the form of groove-like contamination accumulating dead end sink means suitably located in said lubricating oil chamber means adjacent said shielding means and open toward said lubricating oil chamber means against the direction of centrifugal force for collecting particles separated under the effect of centrifugal force from lubricating oil in said lubricating oil chamber means to thereby prevent the entering of such particles into said radially outer bearing means, and conduit means operatively interconnecting said radially outer bearing means to said lubricating oil chamber means thereby substantially bypassing said groove-like dead end sink means, said shielding means comprises sealing ring means sealing said lubricating oil chamber means from the radially outer bearing means, said bypassing conduit means opening into said lubricating oil chamber means ahead of said groove-like dead end sink means as viewed radially inwardly in the direction toward the radially inner bearing means.

2. The device of claim 1, wherein said conduit means are arranged to also bypass said shielding means for connecting the radially outer bearing means to the lubricating oil chamber means.

3. The device of claim 1, further comprising lubricating oil circuit means, said lubricating oil chamber means being incorporated in said lubricating oil circuit means.

4. The device of claim 3, wherein said lubricating oil circuit means constitute a transmission oil circuit of said rotor.

5. The device of claim 4, wherein said lubricating oil circuit means comprise intake means connected to said lubricating oil chamber means near said radially inner bearing means, and outlet means connected to said lubricating oil chamber means substantially adjacent said shielding means.

6. The device of claim 5, wherein said groove-like dead end sink means is positioned substantially between said shielding means and said outlet means of said lubricating oil circuit means.

7. The device of claim 1, wherein said lubricating oil chamber means is an annular chamber, said radially inner and radially outer bearing means having a common rotational axis, said annular chamber extending substantially coaxially with said common rotational axis of the radially inner and radially outer bearing means.

8. The device of claim 1, wherein said receptacle means is an annular groove forming substantially one end of said lubricating oil chamber means, said annular groove being arranged to at least partially overlap said radially outer bearing means.

9. A bearing seal and lubricating device for the bearings of a rotor, comprising rotor housing means, radially outer bearing means located in said housing means and radially inner bearing means also located in said housing means, lubricating oil chamber means in said housing means operatively interconnecting said radially outer bearing means and said radially inner bearing means, each bearing means having a first side facing away from said lubricating oil chamber means a second side facing said lubricating oil chamber means, sealing means sealing said inner and outer bearing means at said first side thereof, shielding means operatively arranged to shield said second side of said radially outer bearing means relative to said lubricating oil chamber means, receptacle means in the form of groove-like contamination accumulating dead end sink means suitably located in said lubricating oil chamber means adjacent said shielding means and open toward said lubricating oil chamber means against the direction of centrifugal force for collecting particles separated under the effect of centrifugal force from lubricating oil in said lubricating oil chamber means to thereby prevent the entering of such particles into said radially outer bearing means, and conduit means operatively interconnecting said radially outer bearing means to said lubricating oil chamber means thereby substantially bypassing said groove-like dead end sink means and said shielding means.

10. The device of claim 9, wherein said shielding means comprise a surface which is inclined toward said groove-like dead end sink means located adjacent to said shielding means, said by-passing conduit means comprising a gap (68) between said shielding means and said radially outer bearing means, said gap facing said groove-like dead end sink means whereby lubricating oil bypasses the shielding means and the groove-like dead end sink means.

* * * * *